United States Patent

[11] 3,581,214

[72] Inventor Ben L. Seegmiller
2235 E. 21st St., Salt Lake City, Utah 84109
[21] Appl. No. 834,817
[22] Filed June 19, 1969
[45] Patented May 25, 1971

[54] DISCRETELY VARIABLE TIME DELAY SYSTEM HAVING SUB-MULTIPLE, ADDITIVE, AND ALTERNATIVE DELAY SELECTION
5 Claims, 1 Drawing Fig.

[52] U.S. Cl. .......... 328/55, 307/265, 307/273, 307/293, 328/58, 328/129, 328/191, 328/207
[51] Int. Cl. .......... H03k 5/159, H03k 5/04
[50] Field of Search .......... 307/273, 293, 265, 267; 328/55, 129, 130, 191, 207, 58

[56] References Cited

UNITED STATES PATENTS

| | | | |
|---|---|---|---|
| 2,931,981 | 4/1960 | Schabaur | 328/55 |
| 2,933,625 | 4/1960 | Townsend et al. | 307/293 |
| 3,089,090 | 5/1963 | Price | 328/55 |
| 3,248,558 | 4/1966 | Seif | 328/207X |
| 3,346,746 | 10/1967 | Gordon | 307/273 |
| 3,426,218 | 2/1969 | Baynard, Jr. | 307/273X |
| 3,463,941 | 8/1969 | McLendon et al. | 307/293 |
| 3,483,401 | 12/1969 | Michalski | 307/293 |
| 3,492,593 | 1/1970 | Ullmann et al. | 307/273X |

OTHER REFERENCES

PUB I " Computer Delay Unit uses Semiconductors" by Scism in Electronics, July 1, 1957, page 173, Vol. 30, #7.

*Primary Examiner*—Stanley D. Miller, Jr.
*Attorney*—M. Ralph Shaffer

ABSTRACT: A time-delay system wherein an input signal triggers the generation of an output signal or pulse that can be accurately controlled as to time delay relative to the input signal, and preferably also as to pulse width. In a preferred form of the invention, the system includes plural circuits the delayed output of a first of which triggers the second, and so forth. Selected time delays of the plural circuits are additive, when desired, and pulse width and polarity are to be predetermined in the final output stage. Switching means are provided to connect in desired fashion one or more selected circuits to the output of the system, and one-shot multivibrators and pulse shaping stages are preferably used in each circuit. Precision resistance-capacitance circuits preferably assist to provide a stepped sequence of time delays as to each respective circuit, and the sequence of respective circuits are preferably related in a submultiple, time-delay relationship.

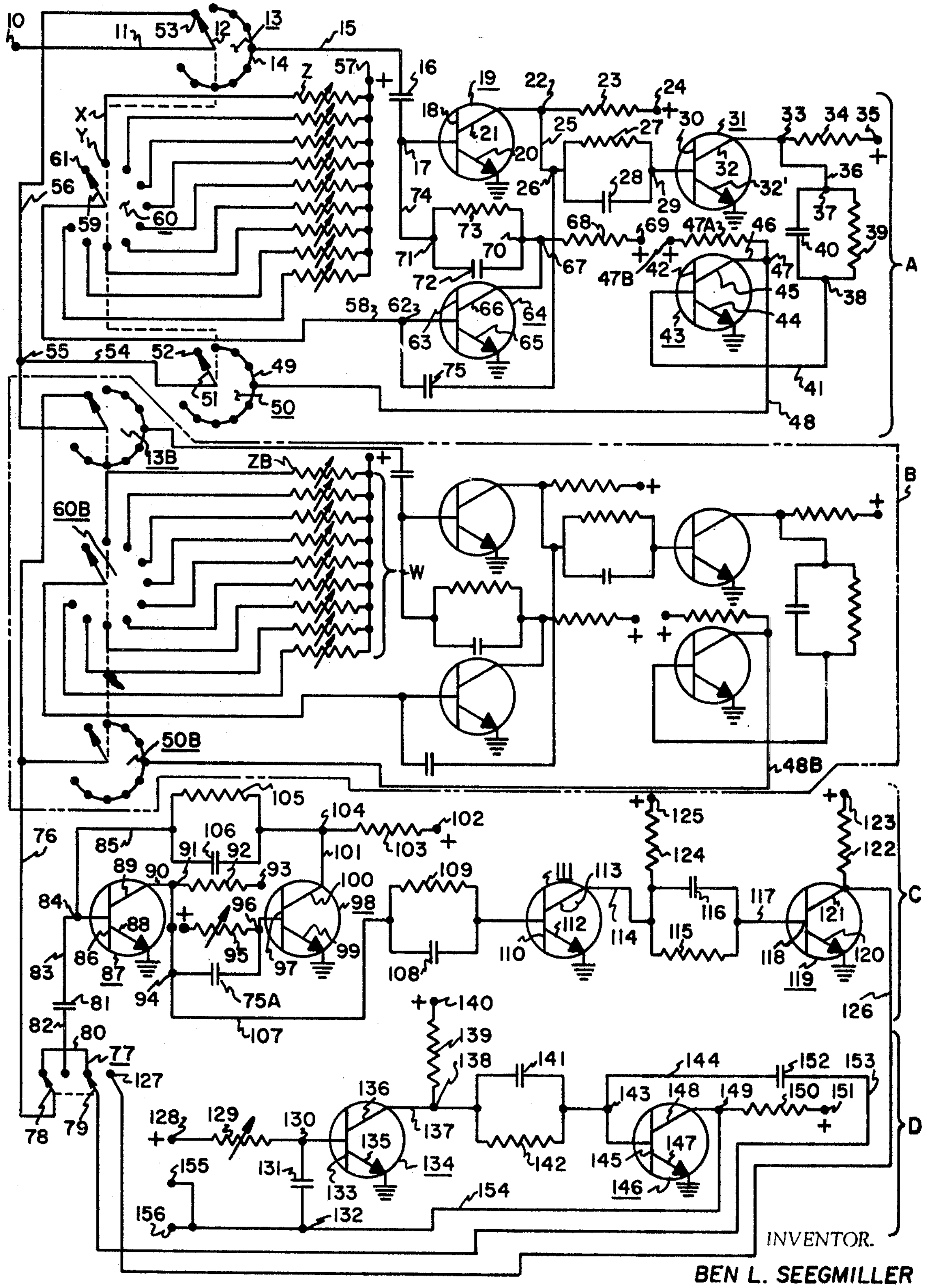
INVENTOR.
BEN L. SEEGMILLER
BY
M. Ralph Shaffer
HIS ATTORNEY

DISCRETELY VARIABLE TIME DELAY SYSTEM HAVING SUB-MULTIPLE, ADDITIVE, AND ALTERNATIVE DELAY SELECTION

The present invention relates to time-delay systems and, more particularly, provides a new and improved time-delay system generating its own signal or series of signals or series of signals in response to a triggering pulse. There are many advantages and desirable features of the instant time-delay system which will be pointed out hereinafter in detail.

In the past time-delay systems have generally taken the form of conventional delay lines. These are quite cumbersome in use and restricted in versatility. More importantly, conventional resistance-capacitance or inductance-capacitance delay lines distort the shape of the input wave or pulse so that the output of the delay line has to be further processed for use in terminal equipment. The harmonic distortion resulting in the output wave form often renders the latter undesirable for direct use since there is no sharp leading edge of the output pulse that is present.

In the present invention, instead of having a triggering pulse delayed per se, the triggering pulse to trigger the generation of an accurate waveform that can be converted into a positive pulse having a rapid rise time and, hence, a sharp vertical leading edge. To achieve this the inventor preferably employs a one-shot multivibrator circuit. This is used merely by way of example, however. In the circuit selected, provision is made such that the time delay between the occurrence of the leading edge of the pulse triggering the generating circuit and the leading edge of the waveform finally produced by such generating circuit can be accurately predetermined and preferably discretely varied. In a preferred form of the invention this is accomplished through a series of parallel-related resistance-capacitance circuits, having a sequence of stepped time constants. These are used as charging or discharging circuits controlling the character of conduction of the control elements, such as transistors, in the multivibrator stage. For extreme accuracy pulse shaping circuits may be employed subsequently to further improve the leading of the output pulse of the multivibrator.

Succeeding stages or circuits generating desired waveforms are selectively switched in and out of the system in the desired manner and, when two or more are serially connected together, the output-wave formed from one circuit is used to trigger the pulse generated in the next succeeding circuit. In this manner, time delays of the two circuits can be made to be cumulative or additive. Thus, if a stepped time-delay sequence of 100 microseconds, 200 microseconds, and so on, is available as regards the first circuit, then the second circuit may be designed so that a time-delay sequence of the order of 10 microseconds, 20 microseconds, and so on, can be achieved. Through proper setting of these circuits, should a time delay of 100 microseconds be selected in the first circuit and a 10 microsecond delay be selected in the second circuit, the final result will be additive, namely, a time-delay of 110 microseconds relative to occurrence of the input triggering pulse to the first circuit and the time occurrence of the leading edge of the pulse generated in the second circuit. Additional, circuits can be employed as desired, and it is best if two or three circuits be utilized with the timed delay sequence being of the order of thousands, hundreds, and tens, or hundreds, tens and fives, and so forth.

The invention also utilized a unique circuit in its output stage wherein the pulse width of the final pulse output can be accurately determined. Accordingly, the end result is a very accurate waveform the leading edge of which can be accurately controlled to produce a time delay relative to the input triggering pulse; in addition, one can accurately determine the pulse width of the final waveform.

Accordingly, the principal object of the present invention is to prove a new and improved time-delay system.

A further object of the present invention is to provide a time-delay system wherein an input pulse is used to trigger the generation of another pulse or signal the time occurrence for which can be accurately delayed relative to the occurrence of the input pulse.

A further object of the invention is to provide an interconnectable series of time-delay circuits in such manner that time delays selected in each of the circuits can be additive.

A further object of the invention is to provide in a time-delay system a series of serially connected circuits such that the output of one circuit or stage will trigger the generation of pulses or signals succeeding stages.

A further object of the invention is to provide a time-delay system incorporating a series of signal-generating circuits which generate or produce signals in response to an input triggering voltage, succeeding stages supplying such triggering voltages as required, and with the system preferably including switching means such that one or more of the circuits present may be coupled in any desired manner to the output circuit of the system.

A further object is to provide a delay-line system incorporating a series of serially connected circuits, wherein the time delay achieved is additive relative to the selected delays of the individual circuits, these circuits preferably having a stepped sequence of time delays, with adjacent sequences being submultiples of the sequence of a prior circuit.

An additional object is to provide a time-delay system which is extremely versatile, which produces a very accurate delay and sharp well-defined signal, and wherein the output signal can be accurately controlled as to pulse width or duration.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

The sole FIGURE is a schematic diagram of a circuit forming one embodiment of the present invention and showing the essential features thereof in a preferred form.

In the sole drawing input terminal 10 is connected by lead 11 to moveable arm 12 of rotary switch 13. Rotary switch 13 is conventional in design and includes a series of circularly arranged contacts connected together and forming a contact ring 14. To this ring is connected lead 15, and interposed in the latter is capacitor 16. Capacitor 16 is connected to junction 17 and from thence to base 18 of transistor 19. Transistor 19 is an NPN-type transistor as are all of the transistors illustrated. Emitter 20 thereof is maintained at a common reference potential hereinafter referred to simply as "-ground," i.e. the same ground as that of the external circuit supplying the triggering pulse relative thereto at 10. Collector 21 connects to junctions 22 and 26 and to one side of resistor 23. The remaining side of resistor 23 is connected to positive voltage terminal 24. Lead 25 joins junction 22 to junction 26, and the parallel combination of resistor 27 and capacitor 28 are intercoupled between junctions 26 and 29. The latter connects to base 30 of transistor 31. Emitter 32′ of transistor 31 is maintained at ground potential, whereas collector 32 is directly connected to junction 33. Resistor 34 interconnects junctions 33 and 35, the latter being maintained at a positive operating potential as indicated. Lead 36 interconnects junctions 33 and 37, and the parallel combination of resistor 39 and capacitor 40 is joined between junctions 37 and 38. Lead 41 interconnects junction 38 with base 42 of transistor 43. The emitter 44 of the latter transistor is maintained in ground potential, whereas collector 45 connects via lead 46 to junction 47. Junction 47 connects through resistor 47A to positive voltage terminal 47B. Lead 48 interconnects junction 47 with contact ring 49 of switch 50. Arm 51 of switch 50 is of rotary type and is ganged to arm 59 of switch 60 as well as to arm 12 of switch 13. The combination of switches 13, 60 and 50 may be of the conventional, ganged, rotary type. Arm 51 is connected by lead 54 to junction 55, and the latter is connected directly by lead 56 to contact 53, designated a first contact of the rotary switch 13.

Independent contacts Y of the rotary switch 16 are respectively connected by their respective leads X through the respective precision-type resistors Z to positive voltage bus 57. These resistors Z, as well as resistors ZB, are made adjustable or variable so they may be set for extreme accuracy as to time delays produced, hereinafter explained.

Lead 58 is interconnected between junction 62 and arm 59, with junction 62 being directly connected to base 63 of transistor 64. Emitter 65 of the latter is grounded, whereas collector 66 is directly connected to junction 67. Resistor 68 interconnects positive voltage terminal 69 to junction 67, and the parallel circuit consisting of resistor 73 and capacitor 72 is connected as shown between junctions 70 and 71. Junction 71 is connected by lead 74 to junction 17 in the manner indicated. Capacitor 75 is interconnected between junction 62 and junction 26 in the manner shown.

The circuitry as above described will be designed as circuit A. In circuit A the variable resistors Z are precision potentiometers or variable resistors, as above explained, which in one form of the invention may consist in values such that the first resistor is of a first vaLue in ohms, the next lower resistor twice this value, and so forth.

The operation of circuit A in the sole FIGURE of the drawings will now be described. In the condition shown, that is, where the ganged rotary switches are on "first position" as indicated, then circuit A is in fact switched out of the circuit and any input pulse appearing at terminal 10 will immediately appear at junction 55. For circuit A to be operative, then the ganged rotary switches must be switched from the initial or first position shown to a second or subsequent position, such that the selected one of resistors Z is connected through its contact Y to switch arm 59 of switch 60.

Assume, by way of example that it is desired to produce an output pulse at contact ring 49 which is positive in character, the same as an input pulse appearing at terminal 10, and which, further, has a time delay relative to its leading edge equivalent to 100 microseconds when compared with the time of occurrence of the leading edge of a pulse received at terminal 10. Transistor 64 will be conducting or turned "on," since its base 63 is connected through junction 62, switch 60, and through a respective resistor Z to positive voltage bus 57. Collector 66, of course, is maintained at a positive operating voltage via junction 67 to positive operating voltage terminal 69. Hence, conduction occuring at transistor 64 will produce a voltage drop across resistor 68, maintaining at approximately ground the potential at junction 67 and hence at junction 17 and base 18 of transistor 19. This maintenance of base 18 at approximately "ground" keeps transistor 19 nonconductive or turned "off." At this point it is explained, parenthetically, that the resistor-capacitor combination of elements 73 and 72 for transistor 19, elements 27 and 28 for transistor 31, and elements 39 and 40 for transistor 43 are simply for the purpose of matching the resistance-capacitance characteristics of these respective transistors, so as to sharpen the output pulse characteristics thereof.

To recapitulate, in the absence of the existence of a positive pulse at input terminal 10, and with the arms 12, 59 and 51 in number 2 position, i.e. advanced forwardly one position in a clockwise direction, transistor 64 is "on" or conductive, transistor 19 is "off," the voltage existing at junction 17 is nearly zero or at "ground," transistor 31 is "on" or conductive, transistor 43 is turned off, capacitor 75 remains uncharged, owing to the positive potential at terminal 24 and bus 57, and the voltage existing at lead 48 is at the operating B+ or positive 12-volt point. Upon the occurrence of an input pulse at 10, or at least a positive voltage rise, the same is coupled through capacitor 16 as input pulse to base 18 of transistor 19, turning this transistor immediately "on" so as to drop the voltage at terminal 26 and allow capacitor 75 to charge through a selected resistor Z. Current surge through such resistor drives transistor 64 to a nonconductive state and keeps it in such state, owing to the selected large time constant of capacitor 75 and the selected resistor Z, until the capacitor 75 has almost completely charged. At this point, current flow through the same selected resistor Z diminishes so as to reduce the voltage drop thereacross and permit base 63 gradually to assume its original positive potential. At this point transistor 64 again becomes conductive so as to reduce the potential at junction 67 and hence at base 18, immediately turning transistor 19 off, transistor 31 on, and transistor 43 off. It is to be noted at this point that the transistor stages associated with transistors 31 and 43 in circuit A are simply stages which invert and then restore the output waveform, howbeit as serially connected pulse shapers for sharpening the leading edge of the output pulse. This final action raises the voltage at junction 47 so that a positive voltage rise now exists at this point. This sudden voltage rise, when subsequently fed through a coupling capacitor becomes a positive voltage pulse for further use. Such further use may be the triggering of a circuit B (note its coupling capacitor corresponding to capacitor 16 in circuit A) which, as shown, is identical to circuit A, save for the exception of changes in resistor values of the variable resistors ZB in circuit B relative to resistors Z in circuit A. Accordingly, if the resistors Z (in combination with capacitor 75) in circuit A from top to bottom produce time delays of 100 microseconds, 200 microseconds, 300 microseconds, and so on, depending upon the selection of the particular resistor Z, then the values of the several variable resistors ZD in circuit D may be chosen such that additional and additive time delays of 10 microseconds, 20 microseconds and so on may be selected and further employed. For example, if the 100 microsecond delay as to circuit A will occur with the use of the uppermost resistor Z and a 10 microsecond delay is further achieved by the achieved by the selection of upper resistor ZD, then a total of 110 microsecond time delay will have been achieved as between the upward rise of the input pulse and the upward rise if the voltage at lead 48B in circuit B (corresponding to lead 48 in FIG. A).

It is noted that the upward pulse or voltage rise present at lead 48 may either be shunted across circuit B when the gang-switches 13B, 60B and 50B are in position 1 as indicated, thus shunting out the tens additive circuit B; or the circuit B with its resistors ZB may be selectively employed to add additional delay into the circuitry. As seen in the drawing, circuit B is substantially identical to circuit A and serves to add additional time delay to the output pulse ultimately produced. This is accomplished by reason of the fact that the output delay waveform of circuit A is used to trigger circuit B. Preferably, the series of resistors ZB will be selected to have resistor values such that the time delay sequence of circuit B is a submultiple of the time delay sequence of circuit A, as achieved through employment of the several resistors Z in circuit A. Of course, a series of parallel connected capacitors in combination with a single resistor might have been used equally as well in providing the necessary time constant series for each of the circuits A and B.

The output from circuit B is fed through lead 76 to switch 77.

In returning now to consider a description of a lower portion of the drawing, it is seen that ganged switch 77 includes plural contacts 27 and plural, ganged, switch arms 78 and 79 as indicated. Lead 82 is connected to one of the terminals 127, and capacitor 81 is coupled thereto and through lead 83 to base 86 of transistor 87. Again, emitter 88 is maintained at a common reference or ground potential. Base 86 is connected by junction 84 through lead 85 to the parallel circuit of capacitor 106 in resistor 105. The opposite side of this parallel circuit is connected through juncture 104 and resistor 103 to positive voltage terminal 102. Junction 104 is coupled to collector 100 by lead 101. Transistor 98, in addition to including collector 100, includes emitter 99 which is maintained at ground potential, and also a base 97. Base 97 is connected through variable transistor 95 to a positive voltage terminal as indicated. Capacitor 75A is connected from base 97 to junction 94. Lead 107 is connected from junction 94 through the parallel circuit of resistor 109 and capacitor 108 to base 110 of transistor 111. Emitter 112 of transistor 111 is maintained at ground potential, whereas collector 113 is coupled by lead 114 to the parallel circuit including resistor 115 and capacitor 116. The latter is coupled by lead 117 to base 118 of transistor 119. Connected to lead 114 is resistor 124 leading to positive voltage terminal 155. Emitter 120 of transistor 119 is maintained at ground potential and the collector of 121 connects to positive voltage terminal 123 through resistor 122. The junction of resistor 122 and collector 121 is connected to lead 126, the latter of which is routed to right-hand terminal 127 of switch 77. It will be observed that the circuit immediately above described is exactly identical to circuits A and B, save for the inclusion of switch 77, and operates in identically the same manner, but with this exception: It is seen that a single variable resistor 95 is employed in lieu of the bank of variable resistors in circuits A and B, respectively. Obviously, several more variable resistors may be inserted in parallel with resistor 95. However, for most purposes it is sufficient that a single resistor be employed such that the time delay of the circuitry can determine by the resistance-capacitance time-constant of capacitor 75A and resistor 95, of the order of 5 microseconds, by way of example. Accordingly, if an overall additive time delay of 115 microseconds relative to the input trigger at input terminal 10 is needed, then the positioning of switch arm 12 in position 02 (one position to the right as shown), and a similar positioning of the switch arm of switch 13B in circuit B, plus the switching in of circuit C by switch 77 will add the three time delays of 100, 10, and 5 microseconds of the three respective circuits A, B, and C since the output of circuit A triggers circuit B, and the output of circuit B triggers circuit C. Note is to be made further that a coupling capacitor 81 is used so that the positive rise in voltage at 48B will be converted simply into a positive pulse for application to base 86 of transistor 87. Absent switch 77 the circuitry of circuit C operates identically to the circuits A and B above described, with the output voltage appearing at the extreme right-hand contact 127 of switch 77 when the switch arms 78 and 79 are moved to their right-hand position. In such event the voltage rise appearing at lead 126 will proceed through contact 127 and switch arm 79 to be impressed through coupling capacitor 152 and via lead 144 to base 145 of transistor 146.

The lowermost circuit D is now to be described. As seen, contact 137 (second from the right) is connected by lead 153 to coupling capacitor 152, with the latter connecting via lead 144 to junction 143. Junction 143 is directly connected to base 145 of transistor 146. Emitter 147 thereof is grounded while collector 148 is connected directly to junction 149 and through resistor 150 to positive voltage terminal 151. Junction 149 is connected by lead 154 to junction 132 and output signal contact 156. Output contact 155 is directly connected to lead 153 in the manner indicated.

Junction 143 is coupled through the parallel transistor-characteristic compensating circuit consisting of resistor 142 and capacitor 141 to junction 138. The latter is coupled through resistor 139 to positive voltage terminal 140. Lead 137 interconnects junction 138 with collector 136. Emitter 135 of transistor 134 is maintained at ground potential, and the base 133 is connected via junction 130 through capacitor 131 to junction 132. Pulse-width determining, variable resistor 129 interconnects junction 130 with positive voltage terminal 128. Terminals 156, 155, of course, are output terminals and will hereinafter be described.

The operation of the bottom circuit D is as follows. The positive voltage rise appears at lead 153 and is transmitted through coupling capacitor 152 as a positive voltage pulse to base 145; in the absence of the occurrence of such a pulse the positive connection of terminal 128 will keep transistor 134 conducting, reducing the voltage at junction 138 to nearly zero so as to turn and maintain transistor 146 "off." The presence of a positive pulse through the transmission of the positive voltage rise through capacitor 152 will turn transistor 146 on, thereby producing a voltage drop at junction 149. This produces a charging of capacitor 131 through variaBle resistor 129. Such charging reduces the potential at junction 130 and base 133 so as to cut off transistor 134 and keep it in a nonconductive state until capacitor 131 has substantially charged to a point near its full capacity. At this point transistor 134 returns to an "on" condition so as to reduce the voltage at junction 138 to nearly the emitter potential of emitter 135, thereby shutting off transistor 146. Hence, in actuality there will appear at terminals 155 and 156 a negative voltage having a leading edge of a time delay equivalent to the additive delays of circuits A, B and C. Additionally, the length of the negative pulse can be preset in accordance with the selected adjustment of variable resistor 129.

What finally obtains therefore, is a method of producing a negative pulse of variable and adjustable width, depending upon the adjustment of resistor 129; a capacitance adjustment of capacitor 131 might effect it equally as well, and with the leading edge of the negative pulse being delayed a desired time. Such time delay can be effected by any one of the three banks or circuits A, B or C, or can be produced by them additively. Thus, if a delay of 5 microseconds is needed, then merely circuit C need be switched in whereas circuits A and B would remain in their initial conditions as shown in the drawing. It is thus seen that by virtue of the 3 composite or grouped ganged switches, i.e. the group consisting of switches 13, 60 and 50, the second group consisting of switches 13B, 50B and 60B, and the third switch simply comprising 77, any one of the time-delay circuits (A, B or C) may be switched in, or any combination of the same or some of them. By leaving switch 77 in its present condition it is noted that circuit C is switched out of the circuit). However, circuit D is always operative. If no time delay whatever is desired, then switch 77 may be left in its present condition as well as all of the remaining switches.

The variable resistors illustrated at Z, ZB and 95 are simply made variable or adjustable for purposes of extreme accuracy that may be required. It is, of course, true that resistors of fixed resistor values may be employed where extreme accuracy is not required.

The invention thus produces a matrix circuit whereby, upon the introduction of a trigger signal or pulse thereto a pulse may be generated and in such generation may be delayed in time and varied as to pulse width as desired. This is especially useful in initiating or producing a sweep on an oscilloscope of adjustable duration and likewise of preselectable delay relative to a given pulse event.

Representative transistors that can be used in the circuitry above described are the General Electric transistor 2N1694, 2N3856A, 2N3855A and 2N3854, manufactured by the General Electric Company, and the Motorola 05127 transistor, manufactured by the Motorola Company.

The above circuit as above described utilizes the novel technique of employing one-shot multivibrators (i.e. the individual circuitries of transistor pairs 19—64, the corresponding transistors in circuit B, 87—98, and 134—146) in achieving its objectives as before stated.

While particular embodiments of the present invention have been shown and described, it will be obvious to those skilled in the art that changes and modifications may be made without departing from this invention in its broader aspects.

I claim:

1. A time-delay system including, in combination, first circuit means responsive to a first circuit input signal for generating a first circuit output signal commencing after the occurrence of said first circuit input signal by a first time delay, second circuit means coupled to said first circuit means and responsive to said first circuit output signal thereof for generating a second circuit output signal commencing after said first circuit output signal by a second time delay, said first and second circuit means each including selection means for selecting the magnitude of such delay in a respective stepped sequence of possible delays, the stepped sequence of one of said circuit means being a submultiple of the stepped sequence of the remaining circuit means, output circuit means for producing a final delayed output signal, and switching means for selectively coupling one, the other, and both additively, of said first and second circuit means to said output circuit means.

2. A time-delay system including, in combination, first circuit means responsive to a first circuit input signal for generating a first circuit output signal commencing after the occurrence of said first circuit input signal by a first time delay, and second circuit means coupled to said first circuit means and responsive to said first circuit output signal thereof for generating a second circuit output signal commencing after said first circuit output signal by a second time delay, said system including output circuit means for producing a final output signal, and switch means for selectively coupling, alternatively, said first circuit means to said output circuit means, said second circuit means to said output circuit means, and said first circuit means through said second circuit means to said output circuit means, for producing said final output signal.

3. Structure according to claim 2 wherein said output circuit means includes adjustable means for varying the time-duration of said final output signal.

4. A time-delay system including, in combination: first, second, and third circuit means each including means responsive to a respective input signal thereto for generating a delayed signal, said first and second circuit means each including adjustable means for varying the magnitude of such delay in a respective stepped sequence, the stepped sequence of said second circuit means being a submultiple of the stepped sequence of said first circuit means, output circuit means for producing a final output signal, and switching means for selectively coupling any one and also any combination of said first, second, and third circuit means to said output circuit for producing said final output signal.

5. Structure according to claim 4 wherein said final output circuit includes means for varying the time-duration of said final output signal.